(No Model.)
J. DAIN, Jr.
VEHICLE SPRING.
No. 317,743. Patented May 12, 1885.
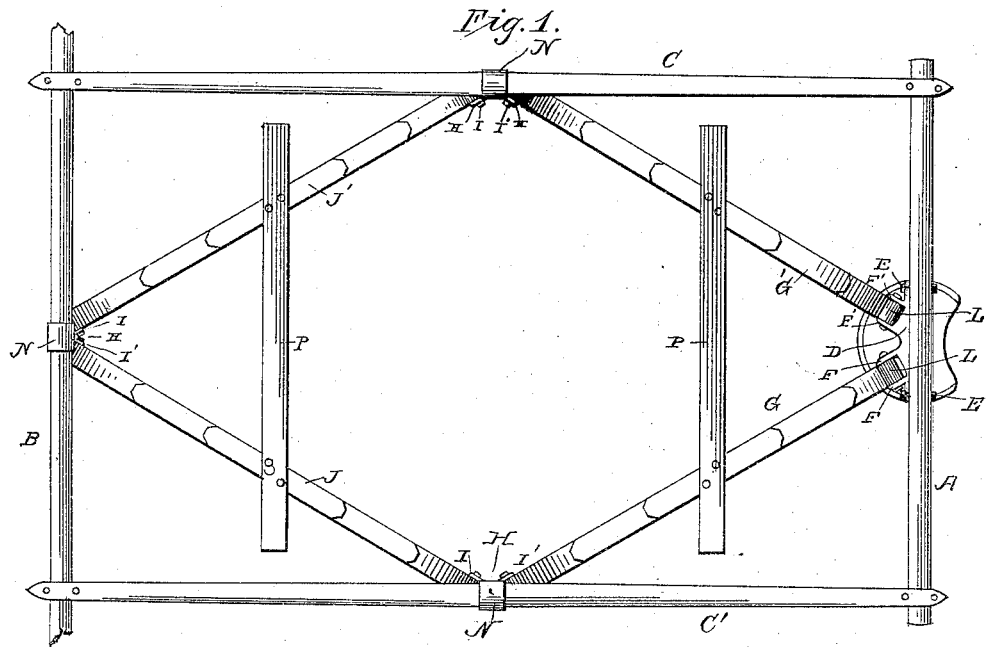
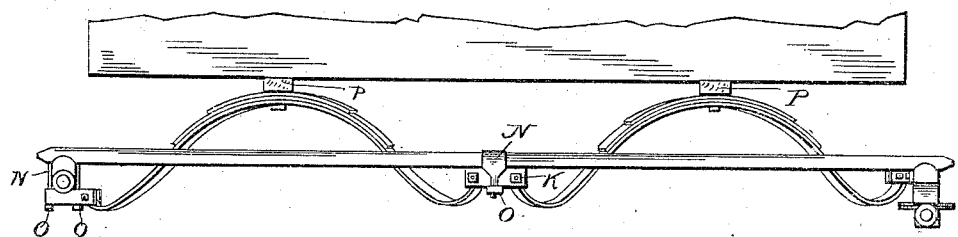
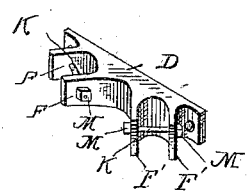
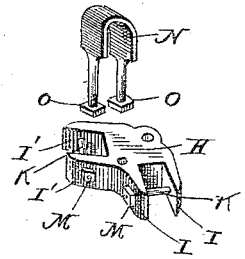
WITNESSES
Jos. Dain Jr,
INVENTOR
by C. A. Snow & Co
Attorneys

UNITED STATES PATENT OFFICE.

JOSEPH DAIN, JR., OF KANSAS CITY, MISSOURI.

VEHICLE-SPRING.

SPECIFICATION forming part of Letters Patent No. 317,743, dated May 12, 1885.

Application filed June 28, 1884. (No model.)

*To all whom it may concern:*

Be it known that I, JOSEPH DAIN, Jr., a citizen of the United States, residing at Kansas City, in the county of Jackson and State of Missouri, have invented a new and useful Vehicle-Spring, of which the following is a specification, reference being had to the accompanying drawings.

This invention has relation to side springs for vehicles; and it has for its objects to produce a vehicle-spring of the class referred to that shall possess superior advantages in points of lightness, cheapness, simplicity, durability, and general efficiency; and to these ends the invention consists in the construction and novel arrangement of parts, as will be hereinafter fully described, and particularly pointed out in the claims.

In the drawings, Figure 1 is a plan view of a portion of the running-gear of a side-bar vehicle with my improvements attached. Fig. 2 is a side elevation of the same. Fig. 3 is a detail view of the bearing-iron and bolts for connecting the front springs to the head-block, and Fig. 4 is a detail view of one of the bearing-irons and the clip-bolt by which the springs are connected to the side bars and the rear axle.

Referring by letter to the accompanying drawings, A designates the head-block, and B the rear axle. The side bars, C C', are connected to the head-block and to the rear axle in the usual well-known manner. The head-block A is provided at its middle portion on its rear face with a plate, D, secured thereto by bolts E E, and having lugs F F' arranged in pairs, the said pairs of lugs diverging rearwardly from each, as shown. The lugs form the bearings for the front ends of the front springs, G G'.

At the middle portions of the side bars, C C', and at the middle of the rear axle, B, I provide a bearing-iron, H, having two sets of diverging lugs, I I'. The bearing-irons H on the side bars form the bearings for the rear ends of the front springs, G G', and the front bearings for the rear springs, J J'. The iron H at the middle of the rear axle, B, forms the bearings for the rear ends of the rear springs, J J'. The several springs are secured in their respective bearings by bolts K, passed through perforations in the lugs and through the eyes L of the springs, and are secured in place by nuts M. The bearing-irons H are secured in place by clips N and nuts O. The springs are semi-elliptic in form, with upwardly-curved ends, as shown, so that although they are secured to rigid bearings they have the same action as if they were attached to loose shackles, with the advantage that the points of attachment do not give way. The box or body is attached to the springs by cross-bars or spring-bars P, bolted rigidly to the middle of the springs. By this arrangement the springs form a complete brace, and it is impossible to rack them or get them out of shape, as is the case with the springs as ordinarily arranged. The springs are of sufficient length to insure a nice easy motion, and still not so long as to give a rocking or tilting motion to the body of the vehicle. Being attached to the middles of the head-block and rear axle, when the wheel strikes an obstruction it can rise quite a distance without interfering materially with the box, as the box is supported quite far from the corners, allowing much more play than if the springs were attached directly to the axle at their outer ends near the wheels. This construction is inexpensive and very durable. It presents a neat and attractive appearance, and is also very light.

Having thus fully described my invention, what I claim as new, and desire to secure by Letters Patent of the United States, is—

1. In combination with a side-bar vehicle, the springs connected thereto and arranged approximately in diamond shape within the side bars, and supporting the body between the latter, as and for the purpose set forth.

2. In a side-bar vehicle, the combination, with the head-block, rear axle, and side bars, of springs arranged approximately in diamond shape within the said side bars, and suitable bearing-irons for connecting the springs to the head-block, rear axle, and side bars, as and for the purpose set forth.

3. The combination, with the head-block, rear axle, and side bars, of the front springs connected to the head-block by a bearing-plate having rearwardly-diverging lugs arranged in pairs, and connected to the side bars by bearing-irons clipped to the side bars, and provided with diverging lugs arranged in pairs, and the rear springs connected to the middle of the rear axle by a bearing-iron having diverging lugs arranged in pairs, and connected to the side bars by the same bearing-irons that connect the front springs thereto, as set forth.

4. The combination, with the head-block, rear axle, and side bars, of the semi-elliptic springs having upwardly-curved ends and bearing-irons, substantially as described, for connecting said springs to the head-block, rear axle, and side bars, in diamond shape, as set forth.

In testimony that I claim the foregoing as my own I have hereto affixed my signature in presence of two witnesses.

JOSEPH DAIN, JR.

Witnesses:
F. L. KAUFMAN,
O. M. GOLDING.